April 17, 1934.  W. H. LEVERETT  1,954,880
PROCESS OF PRODUCING SULPHURIC ACID
Filed Feb. 24, 1931
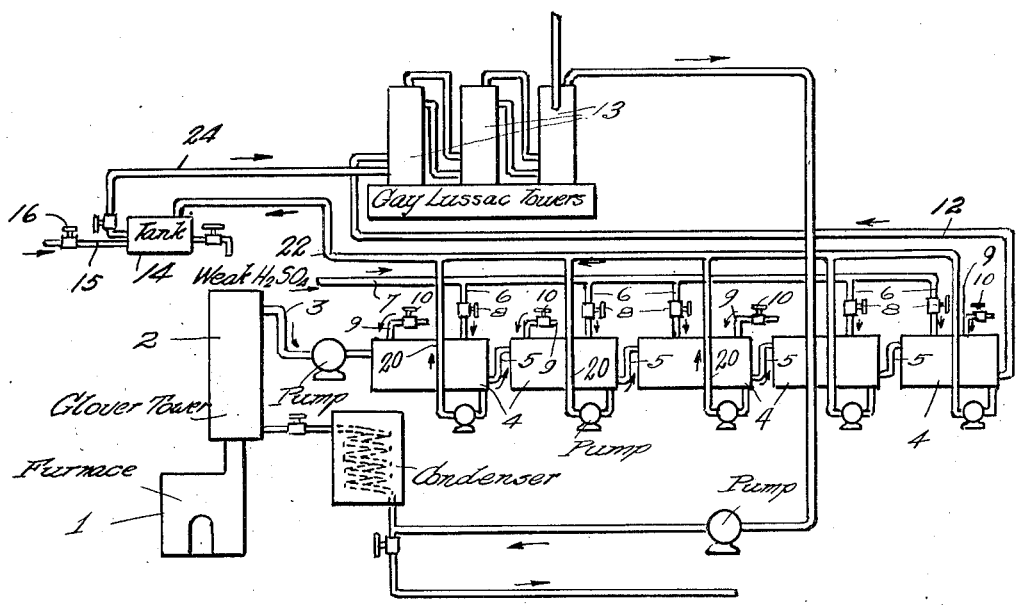
INVENTOR,
Warren H. Leverett.
BY
ATTORNEYS.

Patented Apr. 17, 1934

1,954,880

UNITED STATES PATENT OFFICE 1,954,880

PROCESS OF PRODUCING SULPHURIC ACID

Warren H. Leverett, Bartlesville, Okla., assignor to National Zinc Company, Inc., New York, N. Y., a corporation of New York Application February 24, 1931, Serial No. 517,790

1 Claim. (Cl. 23—168)

This invention relates to the manufacture of sulphuric acid by the chamber process and has for its principal object the utilization of a relatively weak solution of sulphuric acid introduced into the chambers in place of water as is the usual practice.

A further object of the present invention is the manufacture of sulphuric acid by the chamber process at a very important economic saving over the usual practice.

In the chamber process for the production of sulphuric acid, it is well known that a quantity of water is introduced into the chambers to supply necessary elements for the proper production of sulphuric acid. The substances which take part in the principal reactions involved in this process are sulphur dioxide, oxygen, nitrogen oxides and water. The sulphur dioxide is usually obtained by roasting in a suitable furnace, some sulfide, generally pyrites, in contact with air. The oxygen comes from the air, the nitrogen oxides from the action of sulphur dioxide and water upon nitric acid, giving sulphuric acid and nitric oxide. The water is introduced into the chambers of the system in the form of steam or spray and the reaction which produces the greater part of sulphuric acid consists in the interaction of the sulphur dioxide, oxygen, nitrogen peroxide and water for the formation of nitrosylsulphuric acid, and its subsequent decomposition by water, forming sulphuric acid and a mixture of nitric oxide and nitrogen peroxide. The nitric oxide then reacts with more oxygen to reform the peroxide which will then react with more sulphur dioxide, oxygen and water to form more sulphuric acid and oxides of nitrogen. These reactions take place in the chambers until most of the sulphur dioxide is used up, and it is into these chambers that the water is now introduced.

The sulphuric acid formed collects in the bottom of the chambers while a mixture of the oxides of nitrogen and the nitrogen from the air which furnish oxygen issue from the last chamber, and are passed to the Gay Lussac tower where they are treated so that they may again be used in the process.

If sufficient water is not present and the chamber acid is allowed to become too strong, the above mentioned reactions do not take place in a satisfactory manner, the maximum strength being about 55 percent sulphuric acid, hence the chamber acid must test not more than 55 percent sulphuric acid and 45 percent water, and in many cases a considerably lower strength is required. This percentage, of course, varies slightly in different devices.

While large quantities of sulphuric acid of the above strength are used, yet for many purposes a greater part of the water must be removed in order to get a more concentrated product. This concentration is usually accomplished by heating the weak acid in evaporating apparatus to drive off the water until the desired density is obtained. During this evaporating process considerable sulphuric acid is carried off with the water vapors, and is condensed therewith to form a weak solution of sulphuric acid varying from one to forty percent. Weak solutions of sulphuric acid are also produced in ways other than that just described.

It is the principal object of this invention to utilize this weak solution and thereby increase the efficiency of the plant by introducing this weak solution of sulphuric acid into the chambers of the system in such quantities and in such a manner that the sulphuric acid contained therein will be deposited in the bottom of the chamber while the water reacts with the substances in the usual manner, as described above, to produce more sulphuric acid so that the strength of the sulphuric acid formed in the bottom of the chamber will be of a concentration such as to produce the best conditions for the proper operation of the particular system.

The drawing, which is diagrammatic, shows a chamber system in which is a furnace 1, wherein sulphur dioxide is formed. 2 is a Glover tower where the oxides of nitrogen are removed from the nitrosylsulphuric acid, losses replaced by the addition of nitric acid and part of the chamber acids concentrated; the conduit 3, provided with a suitable blower, conveys the gases from the Glover tower to the chambers 4, which are connected in series by conduits 5. The pipes 6, which are new in the system, communicate with the chambers 4, connect with a common feed line 7, and are each provided with a regulating valve 8, whereby the quantity of weak acid solution fed to the separate chambers through pipes 6 and 7 may be regulated. In some cases it may be desirable to feed weak acid solution to only one or a part of the chambers while water is fed to the others. The feed pipe 9, having a control valve 10, is provided for each of said chambers so that water may be fed to any of said chambers to obtain the proper strength of the sulphuric acid contained in the bottom thereof.

Extending from the last chamber 4 is a flue 12 which connects the same with the first of a series of Gay Lussac towers 13 where the oxides of nitrogen are dissolved in concentrated sulphuric acid, passed to the Glover tower and the proper oxides of nitrogen are formed and passed to tank 14 to begin again their circuit through the system. A proper amount of nitric may be supplied to the system through pipe 15 having a control valve 16 and communicating with tank 14.

Each of the chambers 4 is connected at its bottom by means of a pipe 20 connected with a common pipe 22, which in turn communicates with tank 14. This tank 14 is connected with the first Gay Lussac tower 13 by means of pipe 24.

Since the source of supply of weak sulphuric acid to be fed to the chamber or chambers is not material, yet it is well known in the industry that large quantities of practically waste, weak acid is available in the present chamber plants, which if combined with the sulphuric acid in the chambers to produce an acid of suitable concentration, would effect a material economic advantage to the industry.

Furthermore, the weak sulphuric acid produced at the plant during the process of manufacturing the stronger acid must be controlled to prevent a nuisance.

The present invention utilizes this weak acid to effect an economic saving by increasing the efficiency of the plant and controlling a detrimental by-product.

What I claim and desire to protect by Letters Patent is:

The improvement in the chamber process of producing sulphuric acid wherein a series of three or more chambers are used, consisting in introducing a relatively weak solution of sulphuric acid into all except the first chamber of the series.

WARREN H. LEVERETT.